Patented Dec. 31, 1940

2,226,530

UNITED STATES PATENT OFFICE 2,226,530

SODIUM ANTIMONYL-CATECHOL-THIOSALICYLATE

Harold P. Brown and James A. Austin, Kansas City, Mo., assignors to Jensen-Salsbery Laboratories Inc., Kansas City, Mo., a corporation of Missouri No Drawing. Application April 7, 1939,
Serial No. 266,648

1 Claim. (Cl. 260—446)

This invention relates to sodium antimonyl-catechol-thiosalicylate which has therapeutic value.

Antimony has been widely used as a therapeutic agent but is almost invariably administered in the form of some chemical compound which carries it. The other elements included in the compound and the nature of the parts they play in the compound often profoundly modify the effects of the antimony when administered medically and also limit the methods of administering it and the symptoms for which it is used.

It has hitherto been believed that it would be difficult to prepare antimony derivatives of dithiocatechol, dithioresorcinol, dithiohydroquinone or similar compounds containing two or more mercapto groups in the parent nucleus and has further been believed that such compounds, if obtainable, would be unstable.

According to the present invention such compounds may be readily prepared and are stable.

No compounds have hitherto been prepared in which antimony was linked by one valence through sulphur to one radical and was also linked by another valence through oxygen to the same or another radical.

Compounds are known in which the antimony is linked directly to carbon atoms in the same or different radicals. Compounds are also known in which the antimony is linked through oxygen to carbon atoms in the same radical and compounds are known in which antimony is linked through sulphur or oxygen to three monovalent radicals and others have been described in which the exact linkages were only postulated.

Moreover, compounds hitherto prepared in which trivalent antimony was connected to two different radicals were of the general type

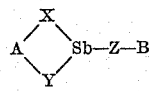

in which A and B were organic radicals and it has been hitherto believed to be essential that a hydroxyl group must be located on one or both of the carbon atoms linked to a carbon atom of B which is linked through oxygen to antimony. Compounds of the type prepared according to this invention do not require the presence of such uncombined hydroxy groups on the carbon atom adjacent to the carbon to oxygen to antimony linkage.

According to the present invention it is possible to prepare compounds in which trivalent antimony is linked through sulphur or oxygen to two different radicals which need contain no hydroxyl groups whatever, may contain hydroxyl groups in other positions and may contain other groups in any of several positions.

Several forms of the invention may be briefly indicated by the general formula

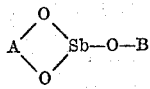

where A is an aliphatic, aromatic or heterocyclic radical having two active valences on adjacent carbon atoms; X, Y and Z are sulphur or some are oxygen and some are sulphur; and B is a radical selected from the same groups from which A is selected and having a single linkage through Z to the antimony atom.

Many compounds covered by this general formula are easily soluble in appropriate solvents. Those containing —OH, —COOH, and —SO₃H groups, for example, which are known as solubilizing groups, are dissolved by aqueous solutions of alkali metal, alkaline earth metal or similar metal hydroxides, carbonates or bicarbonates. Other compounds are soluble in the usual organic solvents.

According to the present invention compounds are prepared which contain antimony linked either to sulphur or to both sulphur and oxygen. These compounds may contain solubilizing groups in either, neither or both of the radicals attached through oxygen or sulphur to the antimony atom.

In preparing a number of these new compounds it has been found advantageous to use fluorine compounds as intermediates or reagents because it has now been found that fluorine compounds react easily and form products of constant composition and satisfactory degree of purity.

Other features and advantages will hereinafter appear. The invention is illustrated by the following examples.

Example 1

0.05 mol of dithiocatechol dissolved in 50 ml. of ethyl alcohol is added in small portions to a rapidly stirred solution of 0.05 mol of potassium antimonyl tartrate dissolved in 250 ml. of water. A yellow precipitate formd soon after each addition. Stirring is continued for one-half hour after addition is complete. The yellow precipitate is collected and washed successively with water, alcohol and ether. The purified material contained approximately 27.1% antimony which corresponds to dithiocatecol-antimonyl-potassium acid tartrate which has the structure

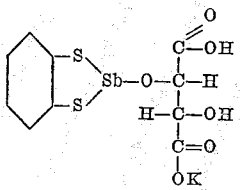

Dissolved in sodium carbonate and repreciptated by acid, a product is obtained containing approximately 29.7% antimony which corresponds to the free acid of the above compound. Meta and para-dimercaptobenzenes may be substituted for dithiocatecol in the above procedure and analogous compounds obtained.

*Example 2*

Dithioantimonial catechol is prepared by treatment of an alcoholic solution of dithiocatecol with freshly precipitated antimony oxide. 0.05 mol of the dithioantimonyl catechol is added in small portions to a solution of 0.05 mol of salicylic acid in 100 ml. of water containing sufficient sodium carbonate to give a solution faintly alkaline to litmus paper. The mixture is kept near boiling and rapidly stirred during the addition and for one-half hour longer. It is kept faintly alkaline by further additions of sodium carbonate as needed. It is filtered hot and the filtrate concentrated until crystallization starts. When cold, the product is collected on a filter. It contains approximately 28.9% antimony which corresponds to dithioantimonyl-catechol-salicylic acid-sodium salt having the formula

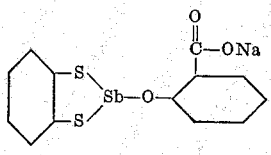

The meta-and-para-hydroxy benzoic acids give results analogous with those described for salicylic acid.

Dithioantimonyl-resorcinol, and dithioantimonyl-hydroquinone can be analogously prepared and used in place of dithioantimonyl-catechol as in the above procedure.

*Example 3*

In an analogous manner to that described above dithioantimonyl-catechol reacts with meconic acid or comenaminic acid to give compounds of the probable structures.

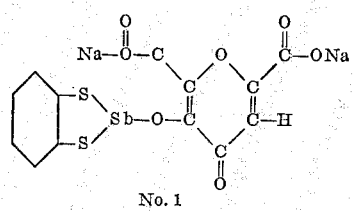
No. 1 and

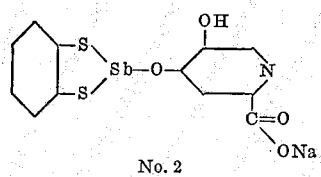
No. 2

Compound No. 1 corresponds to dithioantimonyl-catechol-meconic-acid-disodium salt containing 24.1% antimony and compound No. 2 corresponds to dithioantimonyl-comenaminic acid-monosodium salt containing 27.8% antimony.

*Example 4*

Antimonyl catechol is prepared by a modification of the method of Causse (Bull. Soc. Chim. (3) 8, 245 (1892)). 0.05 mol of antimonyl-catechol is added in small portions to a solution of 0.05 mol of thiosalicylic acid in 100 ml. of water containing sufficient sodium carbonate to give the solution a weakly alkaline reaction to litmus paper. The solution is kept near boiling and stirred rapidly. Stirring is continued one-half hour after addition is complete. The mixture is filtered hot and the filtrate concentrated until crystallization starts. When thoroughly cool the mixture is filtered. The product thus obtained contains approximately 30% antimony which corresponds to antimonyl-catechol-thiosalicylic-acid-monosodium salt and has the structure

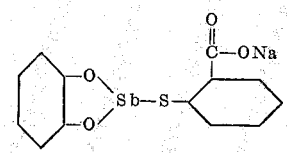

Solution of this material in water followed by acidification gives a product containing approximately 31.8% antimony which corresponds to the free acid of the above salt.

By the same method the meta- and para-mercapto-benzoic acids yield analogous products to those described above for thio-salicylic acid.

*Example 5*

Antimonyl - catechol - thiosalicylic-acid-monosodium salt, described in Example 4 may also be prepared as follows: Catechol-antimonyl-fluoride is prepared by adding a solution of 0.1 mol of catechol dissolved in 50 ml. of water to a solution of 0.1 mol of antimony trifluoride in 100 ml. of water and collecting the resultant precipitate.

To a hot solution of 0.02 mol of thiosalicylic acid in 100 ml. of water containing sufficient sodium carbonate to render it alkaline to litmus paper is added 0.02 mol of catechol-antimonyl-fluoride in small portions with stirring. The solution is maintained alkaline to litmus paper by addition of sodium carbonate or bicarbonate as needed. Stirring is continued for one-half hour after addition is complete. Filtered hot and the filtrate concentrated until crystallization starts, a product is obtained which contains approximately 30% antimony.

The same product is obtained when catechol-antimonyl-chloride, prepared by the reaction of antimony trichloride and catechol in anhydrous benzene reacts with thiosalicylic acid in anhydrous benzene solution. Catechol-antimonyl-bromide, prepared by the reaction of antimony tribromide and catechol in anhydrous benzene may be substituted for the catechol-antimonyl-chloride in this reaction.

*Example 6*

When antimonyl-3,4-dihydroxypyridine or antimonyl-4-methyl-esculetin was substituted for antimonyl-catechol in the reaction with thiosalicylic acid they yielded respectively antimonyl 3,4-dihydroxypyridine-thiosalicylic acid-monosodium salt and antimonyl-4-methyl-esculetin-thiosalicylic acid-monosodium salt having the following formulas:

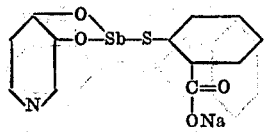

and

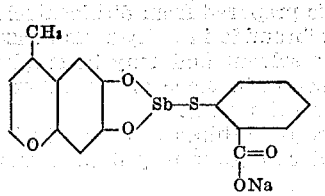

and containing 30.0% and 25.8% antimony respectively.

Furthermore, 2-mercapto-nicotinic acid may be substituted for the thiosalicylic acid to give a compound corresponding to antimonyl-3,4-dihydroxypyridine-2 mercapto-nicotinic-acid-monosodium salt having the formula

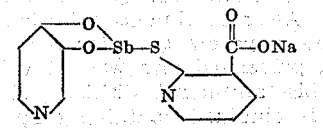

and containing 29.9% antimony and in the case of antimonyl 4-methyl esculetin gives antimonyl-4-methyl-esculetin-2-mercapto-nicotinic acid-monosodium salt corresponding to the formula

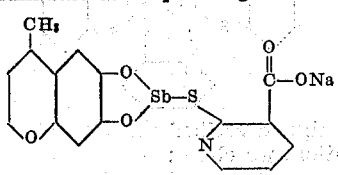

and containing 26.4% antimony.

Example 7

Fluoro-antimonyl-gallate results when 0.1 mol of gallic acid dissolved in 200 ml. of water is added to a solution of 0.1 mol of antimony trifluoride in 200 ml. of water. To a solution of 0.05 mol of the fluoro-antimonyl-gallate thus obtained in 200 ml. of water containing sufficient sodium bicarbonate to render the solution just alkaline to litmus paper is added 0.05 mol of thiophenol dropwise. A precipitate forms which contains approximately 30.5% antimony which corresponds to thiophenyl-antimonyl-gallate having the formula

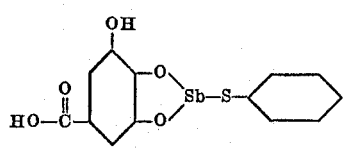

In an analogous manner 2-mercapto-thiophene reacts with a solution of antimonyl-gallate to give a compound, 2-mercapto-thiophene-antimonyl-gallate having the formula

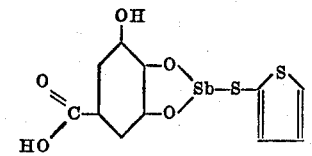

and containing 28.5% antimony. 2-mercapto-thiophene also reacts in analogous manner with comenaminic acid to give a compound antimonyl-comenaminic-acid-2-mercapto-thiophene-monosodium salt having the probable formula

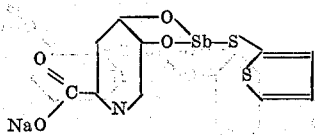

and containing 29.5% antimony.

Example 8

0.05 mol of antimonyl-gallate (Christiansen, J. Am. Chem. Soc. 48, 1367 (1926)), is dissolved in 200 ml. of water containing sufficient sodium carbonate to make the solution just alkaline to litmus paper. 0.05 mol of thiosalicylic acid is dissolved in 100 ml. of water containing sufficient sodium carbonate to make the solution just alkaline to litmus paper. The two solutions are mixed and boiled while being stirred rapidly until crystals start to separate. Cooled, and the solid collected by filtration, a product is obtained which contains approximately 25% antimony which corresponds to antimonyl-gallate-thiosalicylic-acid-disodium salt having the formula

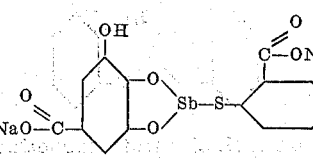

Example 9

0.05 mol of antimonyl-pyrogallol (Causse, Ann. Chim. Phys. (7) 14, 55 (1898)) is added in small portions to a solution of 0.05 mol of thiosalicylic acid in 200 ml. of water containing sufficient sodium carbonate to render the solution faintly alkaline to litmus paper. The solution is maintained slightly alkaline to litmus paper by the addition of sodium carbonate or sodium bicarbonate. Kept near boiling and stirred during the addition, the solution is heated and stirred for one-half hour after completion of the addition. It is filtered hot and concentrated until crystals start to separate. When cool the solids are collected by filtration. The product contains approximately 28.9% antimony which conforms to antimonyl-pyrogallol-thiosalicylic acid-sodium salt having the probable structure

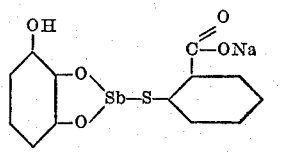

In an analogous manner antimonyl-comenaminic acid reacts with thiosalicylic acid to give a product which is antimonyl-comenaminate-thiosalicylic acid-disodium salt having the structure

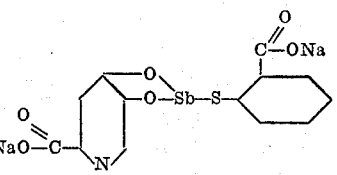

In a similar manner antimonyl-comenaminic acid and 2-mercapto-nicotinic acid react to give a product which probably is antimonyl-comenaminate-2-mercapto-nicotinic acid-disodium salt having the structure

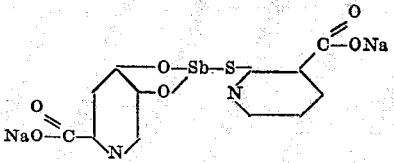

Example 10

0.05 mol of monothiocatechol is dissolved in 100 ml. of ethyl alcohol, thoroughly mixed with 0.05 mol of freshly precipitated antimony trioxide and refluxed for six hours. It is filtered cold and the yellow solid placed in the extraction thimble of a Soxhlet extraction apparatus and extracted with the filtrate. After 24 hours of extraction the extract is filtered. Additional precipitate is obtained by concentrating the filtrate to a small volume and pouring into benzene. The material thus obtained is soluble in alkali and contains approximately 31.1% antimony which corresponds to antimonyl-monothiocatechol-ortho-thiophenol having the formula

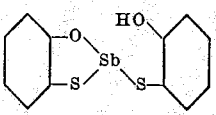

Monothioresorcinol and monothiohydroquinone may be substituted for monothiocatechol in the above procedure and the analogous compounds obtained.

Example 11

Chloroantimonyl-dithiocatechol is prepared by the interaction of antimony-trichloride and dithiocatechol in anhydrous benzene, xylene or similar solvent under reflux.

0.03 mol of chloroantimonyl-dithiocatechol is dissolved in 150 ml. of anhydrous xylene and mixed with a solution of 0.03 mol of thiosalicylic acid in 150 ml. of anhydrous xylene and refluxed until no further evolution of hydrogen chloride could be detected. Evaporation of the xylene and fractional crystallization of the residue gives a product, antimonyl-dithiocatechol-thiosalicylic acid whose antimony content conforms to the formula

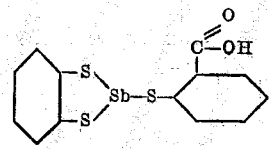

The corresponding bromo-antimonyl-dithiocatechol is prepared from dithiocatechol and antimony tribromide in anhydrous benzene, xylene or similar solvent and may be employed in the above reaction in place of the chloro-compound with identical results.

In place of dithiocatechol, derivatives of this compound can be employed with analogous results.

Chloroantimonyl-dithioresorcinal and chloroantimonyl dithiohydroquinone may be substituted for chloro-antimonyl dithio-catechol in the above procedure with analogous results.

Example 12

0.03 mol of dithiocatechol is stirred into a solution of 0.02 mol of antimony trifluoride in 50 ml. of water. After continuous agitation for about four hours a yellow granular mass separates. Collected, pulverized and washed with ether a product, bis-(antimonyl dithiocatechol)-dithiocatechol is obtained containing approximately 36.7% antimony and which corresponds to the formula

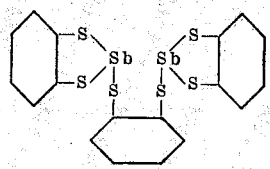

Having thus described certain embodiments of the invention, we claim:

The new product antimonyl-catechol-thiosalicylic acid-sodium salt, a white solid soluble in water, having therapeutic properties and of the formula

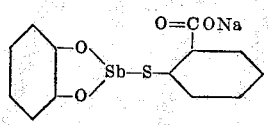

HAROLD P. BROWN.
JAMES A. AUSTIN.